April 13, 1943.	H. W. HIGHRITER ET AL	2,316,583
MANUFACTURE OF TUNGSTIC ACID
Filed Aug. 6, 1941
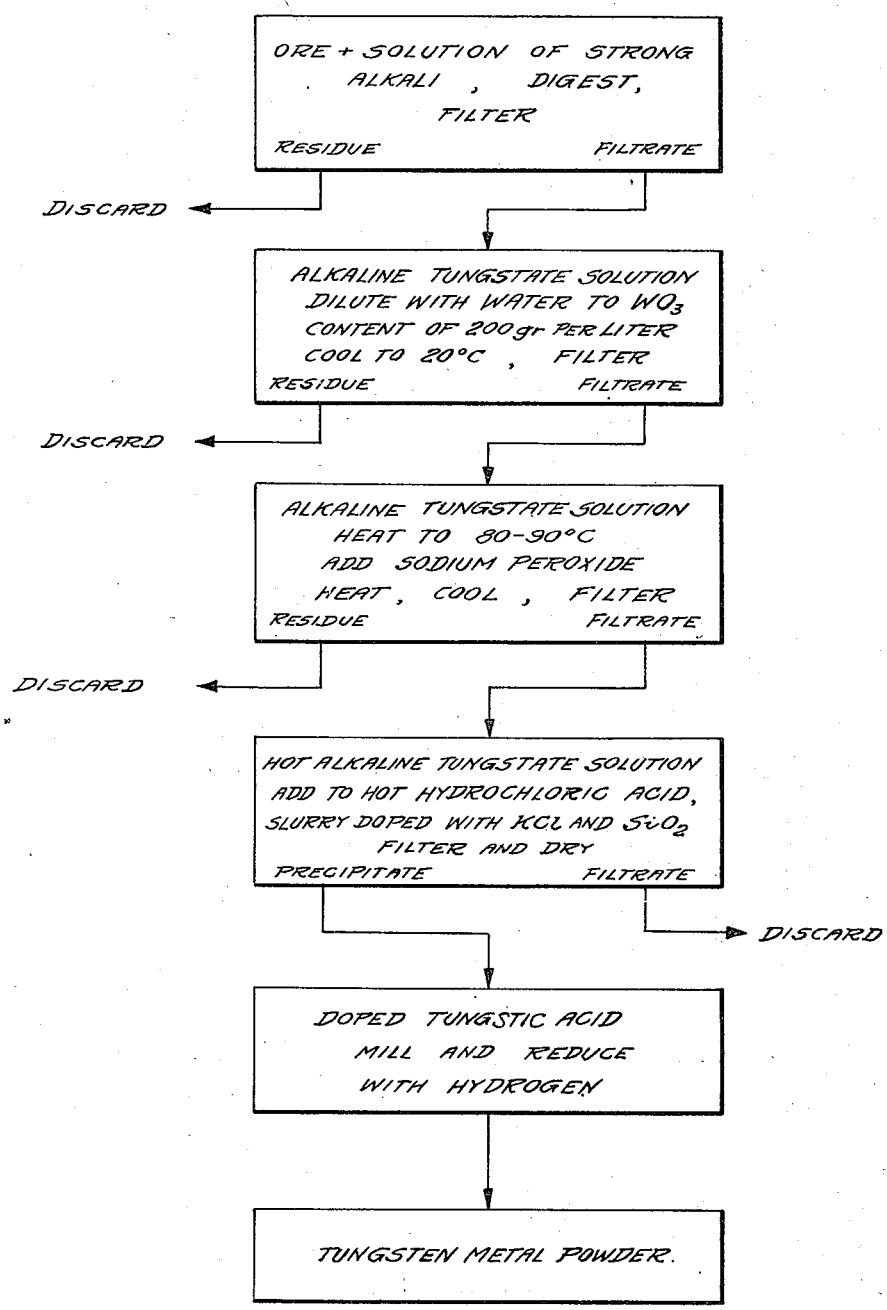
INVENTORS
H. W. HIGHRITER
W. C. LILIENDAHL
BY
ATTORNEY Patented Apr. 13, 1943

2,316,583

UNITED STATES PATENT OFFICE 2,316,583

MANUFACTURE OF TUNGSTIC ACID

Harry W. Highriter, Lake Forest, Ill., and William C. Lilliendahl, Mountain Lakes, N. J., assignors to Westinghouse Electric & Manufacturing Company, East Pittsburgh, Pa., a corporation of Pennsylvania Application August 6, 1941, Serial No. 405,682

16 Claims. (Cl. 75—84)

This invention relates to the manufacture of tungstic acid particularly adapted for being reduced to metallic tungsten and formed into lamp filaments, and more particularly to an improved method for that purpose.

The principal object of our invention, generally considered, is to improve and cheapen the manufacture of tungstic acid particularly adapted for reduction to tungsten for lamp filaments.

Another object of our invention is the improvement in the manufacture of tungstic acid by eliminating the crystallization of potassium tungstate formerly thought necessary for purification purposes.

A further object of our invention is the substitution of sodium hydroxide for potassium hydroxide in order to cheapen the process of manufacturing tungstic acid and tungsten.

Other objects and advantages of the invention, relating to the particular details, will become apparent as the description proceeds.

The drawing shows as a single figure, a flow diagram indicating the various steps in our improved process.

Before discussing our improved process, it might be well to set forth, for comparative purposes, the present so-called "short" Westinghouse process for manufacturing tungsten. This process is cheaper than the older one formerly employed, and the steps thereof are as follows:

1. Digestion of pulverized ore concentrates in boiling caustic potash (potassium hydroxide) solution, using about 85% excess alkali.
2. Filtration of the warm extracted potassium tungstate.
3. Two leachings of the ore sludge with water and filtration of each.
4. First crystallization of potassium tungstate, discarding the mother liquor.
5. Second crystallization of potassium tungstate, with a return of the mother liquor to the first filtrate after ore digestion for recovery of tungsten.
6. Solution of the purified potassium tungstate crystals in water.
7. Precipitation of tungstic acid in hydrochloric acid.
8. Washing the precipitated tungstic acid and simultaneous tank doping.
9. Drying and milling of the doped tungstic acid.
10. Reduction by hydrogen to tungsten metal powder.

Steps 1 to 6, inclusive, were intended to produce an alkali tungstate solution of high purity. Steps 7 to 10, inclusive, are employed to convert such tungstate to metal. Failure during the purification stages to reject undesired impurities, and contamination during the conversion stages, detract from the quality of the finished product. Step 7, precipitation of tungstic acid, might be expected to reject impurities soluble in hydrochloric acid. This is only partially true, as freshly precipitated tungstic acid has colloidal properties, resulting in the adsorption of impurities such as iron.

The filtrations in Steps 2 and 3 are conducted warm or hot and at successively lower concentrations of alkali tungstate. Boiling of the original ore extract for first crystallization is begun before the leaches are added to it.

In accordance with our invention, we improve upon purification Steps 1 to 6, inclusive, as no simpler practicable method for converting an alkali tungstate to metal, other than Steps 7 to 10 inclusive, is known to us.

The various steps in our process which are suggested as an improvement over that above discussed, are as follows:

1. Extraction of ore with a solution of strong alkali either sodium hydroxide or potassium hydroxide. Sodium hydroxide is recommended for its relative cheapness, although potassium hydroxide is slightly more efficient in dissolving the tungstic oxide from the ore. At least 50% excess alkali sohuld be used. After boiling or digesting at elevated temperatures, in accordance with the formerly usual practice as to time, the mixture is filtered hot, the ore sludge leached with hot water, which is added to the filtrate, and the residue discarded.

2. The filtrate, comprising an alkali tungstate solution, is diluted with water to a concentration of about 200 grams of tungstic oxide ($WO_3$) per liter, cooled to about 20° C. and filtered.

3. The residue is discarded, the alkaline tungstate solution comprising the filtrate is heated to between 80 and 90° C., and an oxidizing agent such as sodium peroxide added to destroy sulfides. The solution is then cooled, filtered, and the residue discarded.

4. The alkaline tungstate solution is again heated and introduced into hot hydrochloric acid to precipitate tungstic acid.

5. The slurry formed by this precipitation is doped with potassium chloride and silica, filtered, dried, and the filtrate discarded.

6. The precipitate, consisting of doped tungstic acid, is dried and milled.

7. The milled tungstic acid is reduced by hydrogen to tungsten metal powder.

From the foregoing general discussion it will be seen that the proposed process differs from the usual practice in two essentials:

1. The permissible use of caustic soda instead of caustic potash for the ore digestion and,
2. The elimination of the double crystallization.

The preferred details of our invention are as follows:

The first step of the process may be in accordance with current practice, except that sodium hydroxide may be substituted for potassium hydroxide. In the claims when a solution of a strong alkali is referred to it means a solution of either sodium hydroxide or potassium hydroxide. Thus the crushed ore, which may be wolframite, is digested by hot or boiling caustic alkali in accordance with the usual practice. The concentration of the alkali solution is desirably from about 33% when using sodium hydroxide, to about 45% when using potassium hydroxide.

The mixture is then filtered, the residue discarded, and the filtrate diluted with water to a concentration of about 200 grams of tungstic oxide per liter, to cause precipitation of impurities, such as sulfides. It is then allowed to cool to about 20° C., filtered, and the residue discarded.

Another method of determining the amount of sodium hydroxide for digesting crushed ore, which may be wolframite, is to use an excess of alkali, over that required for decomposition which corresponds to from 80 to 180 grams of sodium hydroxide per liter of extract, or the amount of potassium hydroxide which gives an equivalent hydroxyl concentration. After digestion, in accordance with the above, using a similar alkali concentration, the mixture is filtered, the residue discarded, and the filtrate diluted with water to an excess hydroxyl concentration corresponding with that provided by from 30 to 60 grams of sodium hydroxide per liter, in order to cause precipitation of impurities. The solution is then allowed to cool to about 20° C., filtered, and the residue discarded.

In both of the above instances, an approximate dilution may be conveniently accomplished by adding one and one-half liters of water to each liter of extract.

The filtrate, comprising an alkali tungstate solution, is heated to between 80 and 90° C., solid sodium peroxide, $Na_2O_2$, added, and the mixture digested for about one hour to oxidize residual sulfides formed in the original digestion due to the presence of sulphur in the ore. The amount of sodium peroxide employed should be about 2% of the weight of the tungstic acid content in the solution.

After cooling and removal of any precipitate by filtration, tungstic acid is precipitated in the acidity range between 25 and 7% of hydrochloric acid. The amount of 25% hydrochloric acid initially required may be calculated from the potassium oxide or sodium oxide content of the solution and the volume of the tungstate solution as follows:

Let
$x$=weight of the 25% hydrochloric acid
$a$=volume of tungstate solution
$b$=weight of pure HCl equivalent to $K_2O$ or
$Na_2O$ content of tungstate solution.
Then:
$$0.25x - (a+x)0.07 = b$$

As an example of how the above formula may be employed, suppose we have 8 liters of solution containing 168 grams per liter of $K_2O$ and 200 grams per liter of $WO_3$. Then the 8 liters contain $8 \times 200 = 1600$ grams $WO_3$ and $8 \times 168 = 1344$ grams $K_2O$. The HCl equivalent equals $1344 \times 0.774 = 1040$ grams pure HCl. Substituting in formula: $0.25x - (8000+x)0.07 = 1040$. Solving: $x = 8900$ grams 25% HCl $= 8900/1.12 = 7950$ cc. 25% HCl.

In precipitating tungstic acid from the tungstate solution with hydrochloric acid, both solutions are heated to about 80° C., and the tungstate solution added to the acid through small glass orifices, preferably not greater than 20 mils. The rate of flow is desirably kept constant at about 150 ml. per minute and may be regulated by compressed air. During precipitation the acid should be stirred continuously and 180 ml. of concentrated nitric acid added (to 8 liters) in three equal portions—60 ml. at the start—60 ml. after the tungstic acid is half precipitated, and 60 ml. at the end. This addition of an oxidizing acid serves to prevent reduction of the tungstic acid, and also counterbalances the loss of acid due to evaporation. As an alternative, the standard method of tungstic acid precipitation may be employed.

At the end of the precipitation, the slurry should be stirred for one-half hour and the concentration of hydrochloric acid reduced to approximately 5% by the addition of water.

The excess potassium chloride is desirably removed by washing by decantation, using approximately 2% hydrochloric acid as the wash water, until the alkali content of the latter falls to approximately 200 mg. per liter.

The tungstic acid slurry produced is then "doped" with approximately 0.5% potassium chloride and 0.4% silica, i. e., the percentage of "dope" in the tungstic acid is in accordance with the method described and claimed in Patent No. 1,965,222, granted July 3, 1934, to F. H. Driggs.

After agitation, the slurry is desirably allowed to stand for about twenty-four hours and filtered with suction. The tungstic acid is then dried at about 108° C., crushed, and mixed by tumbling. The tungstic acid may then be reduced in hydrogen, using iron boats, the resulting tungsten powder pressed, fired, treated, swaged and drawn into wire according to standard practice.

As examples of ore extractions effected in accordance with our invention, we have used on 69½ grams of wolframite, 26.8 grams of sodium hydroxide, involving approximately 50% excess, with 81 grams of water. The mixture was allowed to digest hot for about twelve hours and only .54% of the charge remained as undecomposed ore expressed as tungstic oxide.

In another instance we used 37 grams of potassium hydroxide with 69½ grams of wolframite ore, being 100% excess, and mixed with 81 grams of water. The mixture was digested hot for about eight hours, resulting in a loss of 2.8 grams of water, and leaving undecomposed in the sludge .39% of the charge expressed as tungstic oxide.

From the foregoing disclosure it will be seen that we have improved on the process of producing tungstic acid, and particularly that suitable for the manufacture of tungsten metal and lamp filaments produced therefrom, by a method which may avoid the employment of relatively expensive potassium hydroxide by using sodium hydroxide instead, and the relatively expensive and wasteful practice of crystallizing the alkaline tungstate for purification purposes, and substituted a double filtration, the use of sodium peroxide, and a jet precipitation of tungstic acid, thereby resulting in a formation of such acid of coarser texture or less colloidal, and thus carrying less impurities than would otherwise have been the case.

Although a preferred embodiment of our invention has been disclosed, it will be understood that modifications may be made within the spirit and scope of the appended claims.

We claim:

1. The method of manufacturing tungstic acid comprising treating tungsten ore with a hot solution of a strong alkali, filtering, diluting the alkaline tungstate solution comprising the filtrate, cooling, again filtering to avoid the necessity of a purifying crystallization, oxidizing sulfides, and adding the filtrate to hydrochloric acid while both are heated.

2. The method of manufacturing tungstic acid comprising treating tungsten ore with a hot solution of a strong alkali, filtering, diluting the alkaline tungstate solution comprising the filtrate, cooling, filtering, heating the filtrate, adding sodium peroxide, digesting to oxidize sulfides, filtering, and adding the filtrate to hydrochloric acid while both are heated.

3. The method of manufacturing tungstic acid comprising treating tungsten ore with a hot solution of a strong alkali, filtering, diluting the alkaline tungstate solution comprising the filtrate with water until it reaches a concentration of about 200 grams of tungstic oxide per liter, cooling, filtering, and adding the filtrate to hydrochloric acid while both are heated to about 80° C. to precipitate tungstic acid.

4. The method of manufacturing tungstic acid comprising treating tungsten ore with a hot solution of a strong alkali, filtering, diluting the alkaline tungstate solution comprising the filtrate with water until it reaches a concentration of about 200 grams of tungstic oxide per liter, filtering at a temperature of about 20° C., heating the filtrate to about 80° C., adding about 4 grams per liter of solid sodium peroxide, digesting to oxidize sulfides, cooling, filtering, and adding the filtrate to hydrochloric acid while both are heated to about 80° C. to precipitate tungstic acid.

5. The method of manufacturing tungstic acid comprising treating tungsten ore with a hot solution of sodium hydroxide, filtering, diluting the sodium tungstate solution comprising the filtrate, cooling, again filtering to avoid the necessity of a purifying crystallization, adding a peroxide to oxidize sulfides, and adding said filtrate to hydrochloric acid while both are heated.

6. The method of manufacturing tungstic acid comprising treating tungsten ore with a hot solution of sodium hydroxide, filtering, diluting the sodium tungstate solution comprising the filtrate, cooling, filtering, heating the filtrate, adding sodium peroxide, digesting to oxidize sulfides, filtering and adding the filtrate to hydrochloric acid while both are heated.

7. The method of manufacturing tungstic acid comprising treating tungsten ore with a hot solution of sodium hydroxide, filtering, diluting the sodium tungstate solution comprising the filtrate with water until it reaches a concentration of about 200 grams of tungstic oxide per liter, cooling, filtering, and adding the filtrate to hydrochloric acid while both are heated to about 80° C. to precipitate tungstic acid.

8. The method of manufacturing tungstic acid comprising treating tungsten ore with a hot solution of about 33% sodium hydroxide, filtering, diluting the sodium tungstate solution comprising the filtrate with water until the alkalinity falls to between about 30 and 60 grams of excess sodium hydroxide per liter, filtering at a temperature of about 20° C., heating the filtrate to about 80° C., adding about 4 grams per liter of solid sodium peroxide, digesting to oxidize sulfides, cooling, filtering and adding the filtrate to hydrochloric acid while both are heated to about 80° C. to precipitate tungstic acid.

9. The method of manufacturing tungstic acid comprising treating tungsten ore with a hot solution of potassium hydroxide, filtering, diluting the potassium tungstate solution comprising the filtrate, cooling, again filtering to avoid the necessity of a purifying crystallization, adding a peroxide to oxidize sulfides and adding said filtrate to hydrochloric acid while both are heated.

10. The method of manufacturing tungstic acid comprising treating tungsten ore with a hot solution of potassium hydroxide, filtering, diluting the potassium tungstate solution comprising the filtrate, cooling, filtering, heating the filtrate, adding sodium peroxide, digesting to oxidize sulfides, filtering and adding the filtrate to hydrochloric acid while both are heated.

11. The method of manufacturing tungstic acid comprising treating tungsten ore with a hot solution of potassium hydroxide, filtering, diluting the potassium tungstate solution comprising the filtrate with water until it reaches a concentration of about 200 grams of tungstic oxide per liter, cooling, filtering, and adding the filtrate to hydrochloric acid while both are heated to about 80° C. to precipitate tungstic acid.

12. The method of manufacturing tungstic acid comprising treating tungsten ore with a hot solution of 45% potassium hydroxide, filtering, diluting with potassium tungstate solution comprising the filtrate with water until the alkalinity falls to between about 42 and 84 grams of excess potassium hydroxide per liter, filtering at a temperature of about 20° C., heating the filtrate to about 80° C., adding about 4 grams per liter of solid sodium peroxide, digesting to oxidize sulfides, cooling, filtering and adding the filtrate to hydrochloric acid while both are heated to about 80° C. to precipitate tungstic acid.

13. The method of manufacturing tungstic acid comprising treating tungsten ore with a solution of a strong alkali, filtering, making the filtrate up to a tungstic oxide content of about 200 grams per liter, filtering at a temperature of about 20° C., heating the filtrate to a temperature between 80 and 90° C., adding about 4 grams per liter of solid sodium peroxide, digesting for about one hour to oxidize sulfides, cooling, filtering, and precipitating tungstic oxide by injecting the filtrate in small jets into about 25% hydrochloric acid while both are heated to about 80° C.

14. The method of manufacturing tungstic acid comprising treating tungsten ore with a solution of a strong alkali in excess, filtering, making the filtrate up to a tungstic oxide content of about 200 grams per liter, filtering at a temperature of about 20° C., heating the filtrate to a temperature between 80 and 90° C., adding solid sodium peroxide, digesting to oxidize sulfides, cooling, filtering, adding the filtrate in the form of jets to about 25% hydrochloric acid while both are heated to about 80° C., stirring during the precipitation while adding nitric acid to prevent reduction and counterbalance the acid loss, stirring, adding water to reduce the hydrochloric acid concentration to about 5%, removing the excess of alkaline chloride by decantation, washing with about 2% hydrochloric acid, until alkali content of such water is reduced to about 20 mg. per 100 ml.

15. The method of manufacturing tungstic acid, comprising making up an alkaline tungstate solution from the ore, so that the tungstic oxide content is about 200 grams per liter, filtering cool, heating, adding solid sodium peroxide, digesting to oxidize sulfides, cooling, filtering, adding the filtrate in the form of jets to hydrochloric acid while both are heated, stirring during precipitation, adding a small proportion of nitric acid during precipitation to prevent reduction and counterbalance the acid loss, stirring, diluting, washing, and decanting to remove excess chloride.

16. The method of manufacturing tungstic acid, comprising making up an alkaline tungstate solution from the ore, so that the tungstic oxide content is about 200 grams per liter, filtering cool, heating, adding solid sodium peroxide, digesting to oxidize sulfides, cooling, filtering, adding the filtrate in the form of jets to hydrochloric acid while both are heated, stirring during precipitation, adding a small proportion of nitric acid during precipitation to prevent reduction and counterbalance the acid loss, stirring, diluting, washing, and decanting to remove excess chloride.

HARRY W. HIGHRITER.
WILLIAM C. LILLIENDAHL.